# (12) United States Patent
Yagisawa

(10) Patent No.: US 8,585,432 B2
(45) Date of Patent: Nov. 19, 2013

(54) CONNECTOR AND OPTICAL TRANSMISSION APPARATUS

(75) Inventor: Takatoshi Yagisawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 128 days.

(21) Appl. No.: 13/227,913

(22) Filed: Sep. 8, 2011

(65) Prior Publication Data

US 2012/0063787 A1   Mar. 15, 2012

(30) Foreign Application Priority Data

Sep. 9, 2010   (JP) .................................. 2010-201531

(51) Int. Cl.
*H01R 12/00*   (2006.01)

(52) U.S. Cl.
USPC .......................................................... 439/493

(58) Field of Classification Search
USPC ............................................. 439/493, 67, 77
See application file for complete search history.

(56) References Cited

U.S. PATENT DOCUMENTS

| | | | | |
|---|---|---|---|---|
| 3,221,286 A | * | 11/1965 | Feede | 439/67 |
| 3,492,538 A | * | 1/1970 | Fergusson | 361/803 |
| 3,562,798 A | * | 2/1971 | Bragg, Jr. | 439/67 |
| 3,602,870 A | * | 8/1971 | Willard | 439/74 |
| 3,629,787 A | * | 12/1971 | Wilson | 439/67 |
| 3,851,294 A | * | 11/1974 | Palazzetti et al. | 439/272 |
| 4,060,889 A | * | 12/1977 | Zielinski | 29/854 |
| 4,111,510 A | * | 9/1978 | Zurcher | 439/67 |
| 4,169,641 A | * | 10/1979 | Olsson | 439/493 |
| 4,252,389 A | * | 2/1981 | Olsson | 439/65 |
| 4,358,172 A | * | 11/1982 | Narozny | 439/65 |
| 4,583,800 A | * | 4/1986 | Roberts et al. | 439/64 |
| 4,691,972 A | * | 9/1987 | Gordon | 439/77 |
| 4,850,883 A | * | 7/1989 | Kabadi | 439/67 |
| 5,007,842 A | * | 4/1991 | Deak et al. | 439/66 |
| 5,057,023 A | * | 10/1991 | Kabadi et al. | 439/67 |
| 5,219,293 A | * | 6/1993 | Imamura | 439/67 |
| 5,306,162 A | * | 4/1994 | Armendariz | 439/67 |
| 5,730,619 A | * | 3/1998 | Hamlin | 439/493 |
| 6,358,064 B2 | * | 3/2002 | Szalay et al. | 439/67 |
| 2008/0009179 A1 | * | 1/2008 | Tadokoro | 439/493 |
| 2008/0158181 A1 | * | 7/2008 | Hamblin et al. | 345/173 |
| 2008/0233793 A1 | * | 9/2008 | Ju | 439/493 |

FOREIGN PATENT DOCUMENTS

| | | |
|---|---|---|
| JP | 2005-44769 | 2/2005 |
| JP | 2006-295101 | 10/2006 |
| JP | 2009-38250 | 2/2009 |
| JP | 2009-283901 | 12/2009 |
| JP | 2010-73786 | 4/2010 |

* cited by examiner

*Primary Examiner* — Gary F. Paumen
(74) *Attorney, Agent, or Firm* — Staas & Halsey LLP

(57) ABSTRACT

An optical transmission apparatus includes first and second circuit boards, and a connector. The first circuit board includes an optical transmission processing circuit, a first transmission line electrically coupled to the optical transmission processing circuit, a first pad on one surface of the first circuit board electrically coupled to the first transmission line, and a second pad on the other surface of the first circuit board electrically coupled to the first pad. The second circuit board includes a second transmission line of a layer of a multilayered structure, and a third pad on one surface of the second circuit board electrically coupled to the second transmission line and the second pad. The connector has an electrode disposed in two dimensions at a position to couple with the first pad in the case of the second circuit board is electrically coupled with the first circuit board.

7 Claims, 18 Drawing Sheets

CONNECTOR AND OPTICAL TRANSMISSION APPARATUS

CROSS-REFERENCE TO RELATED APPLICATIONS

This application is based upon and claims the benefit of priority of the prior Japanese Patent Application No. 2010-201531, filed on Sep. 9, 2010, the entire contents of which are incorporated herein by reference.

BACKGROUND

1. Field

Various embodiments described herein relate to a connector and an optical transmission apparatus.

2. Description of the Related Art

In physical designs of electronic devices, flexible printed circuits (FPC: Flexible Printed Circuits) are widely used for connection of signal lines between a printed circuit board and devices through a connector.

The flexible printed circuit is a printed circuit board having flexibility, and the printed circuit board can be bent so that the flexible printed circuit is often used for small products, such as a cellular phone, a digital camera, etc., in which the implementation space is limited.

On the other hand, in recent years, rapid reduction in size, weight and thickness has been made on electronic devices. And micro-fabrication of semiconductor parts and passive parts, etc., has been progressed, resulting in demands for high-density implementation.

In these circumstances, there is a trend toward an increase in the number of pins of a connector connecting wiring lines of a printed circuit board and a flexible printed circuit. And demands are on the rise for narrowing a pitch of a connector unit, and for a conductor unit to support broadband access.

As a related-art technique, a proposal has been made of a wiring circuit board intended to suppress conductive noise (Japanese Unexamined Patent Application Publication No. 2009-38250). Also, a broadband flat-cable coupler has been proposed (Japanese Unexamined Patent Application Publication No. 2005-044769).

However, when an attempt is made to transmit a high-speed signal (for example, not less than 25 Gb/s) using a connector having a related-art narrow pitch, there has been a problem in that crosstalk arises between adjacent channels, and transmission quality has been deteriorated.

SUMMARY

In view of such problems, according to an aspect of an embodiment of the present invention, an optical transmission apparatus includes a first circuit board, a second circuit board, and a connector. The first circuit board includes an optical transmission processing circuit performing transmission processing of optical signals, a first transmission line electrically coupled to the optical transmission processing circuit, a first pad on one surface of the first circuit board electrically coupled to the first transmission line, and a second pad on the other surface of the first circuit board electrically coupled to the first pad. The second circuit board includes a second transmission line of a layer of a multilayered structure, and a third pad on one surface of the second circuit board electrically coupled to the second transmission line and the second pad. The connector has an electrode disposed in two dimensions at a position to couple with the first pad in the case of the second circuit board is electrically coupled with the first circuit board. The first pad is electrically coupled to the electrode.

The object and advantages of the various embodiments will be realized and attained by means of the elements and combinations particularly pointed out in the claims. It is to be understood that both the foregoing general description and the following detailed description are exemplary and explanatory and are not restrictive of the various embodiments, as claimed.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
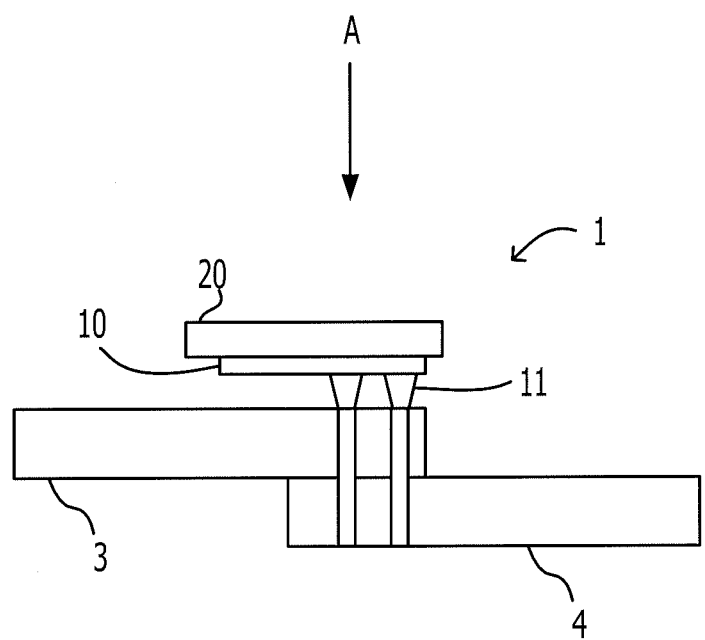
FIG. 1 is a diagram illustrating an example of a configuration of a connector.
Figure 2:
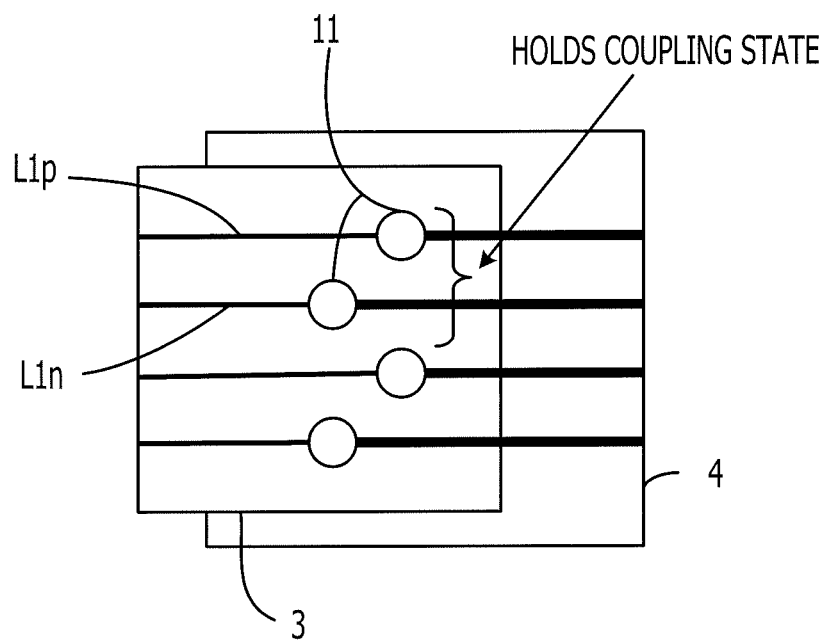
FIG. 2 is a diagram illustrating an example of a configuration of the connector.

In the following, a description will be given of embodiments with reference to the drawings. FIGS. 1 and 2 are diagrams illustrating an example of a configuration of a connector. FIG. 2 is a view taken from A direction of FIG. 1. A connector 1 includes a sheet 10 on which bump(s) (electrode(s)) 11 is/are disposed, and a cover 20 positioned on a back surface of the sheet 10. For example, the connector 1 is a high-frequency connector connecting high-frequency signals electrically.

For a transmission line L1p (first transmission line) and a transmission line L1n (second transmission line), which form a pair on a circuit board 3 (first circuit board), the bump 11 electrically couples the transmission line L1p to a circuit board 4 (second circuit board), and electrically couples the transmission line L1n to the circuit board 4.

Here, the electrodes 11 are disposed at positions where the coupling state is maintained between the transmission line L1$p$ and the transmission line L1$n$ at the time of connection from the circuit board 3 to the circuit board 4 (for details, a description will be given in FIG. 6 and after that).

Next, before the connector 1 is described, descriptions will be given of individual connector connections in a general flexible-printed-circuit connector and a high-density flexible-printed-circuit connector having a narrow pitch using FIGS. 2 to 5.

Figure 3:
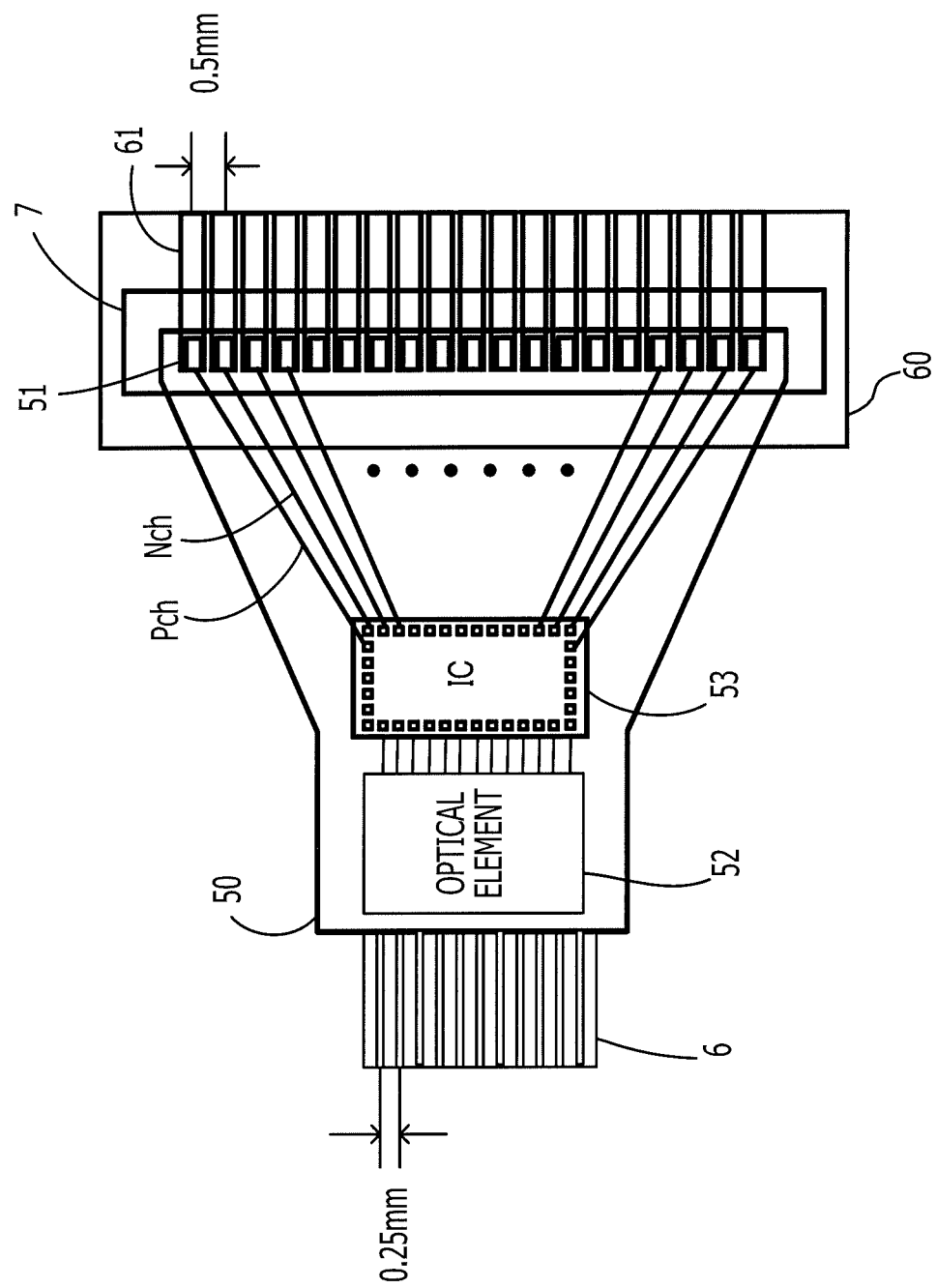
FIG. 3 is a diagram illustrating an example of connection of a general flexible-printed-circuit connector.

FIG. 3 is a diagram illustrating an example of connection of a general flexible-printed-circuit connector. FIG. 3 illustrates a state in which a flexible printed circuit 50 with an electronic part mounted thereon is electrically coupled onto a printed circuit board 60 using a flexible-printed-circuit connector 7.

An optical element 52 and the electronic part (In the following, an IC (Integrated Circuit)) 53 are mounted on the flexible printed circuit 50. A sheet-shaped optical waveguide (polymer waveguide) 6 that can be laminated on the flexible printed circuit 50 is electrically coupled to the optical element 52. Also, pads (PADs) 51, which are electrode units, are disposed in one column on the flexible printed circuit 50, and are electrically coupled to terminals of the IC 53.

The flexible printed circuit connector 7 has electrodes that are disposed at same positions with those of the PADs 51, respectively, and wire lines of the flexible printed circuit 50 and the corresponding wire lines of the printed circuit board 60 are electrically coupled with one another through the flexible printed circuit connector 7.

That is to say, one of the PADs 51 of the flexible printed circuit 50 and a corresponding transmission line 61 of the printed circuit board 60 are electrically coupled (in this regard, in the figure, the flexible printed circuit connector 7 is illustrated to be seen through so that a connection state of the PADs 51 of the flexible printed circuit 50 and the transmission lines 61 of the printed circuit board 60 can be seen).

A description will be given of a signal flow in the case where the optical element 52 is assumed to be a light-receiving element, for example. An optical signal transmitted from the outside through the polymer waveguide 6 is received, and then converted into an optical current signal by the optical element 52. The IC 53 converts the optical current signal into an electric voltage signal, and outputs the signal. The voltage signal output from the IC 53 is electrically coupled to the transmission line 61 on the printed circuit board 60 through the PAD 51 on the flexible printed circuit 50.

In this regard, the IC 53 performs differential transmission in order to receive the optical signal and transmit it at a high speed. That is to say, the IC 53 transmits one-channel signal through a P (positive) channel and an N (negative) channel that are in opposite phases with each other using a pair of signal lines.

Here, the pitch of the optical waveguide of the polymer waveguide 6 is assumed to be 0.25 mm. On the other hand, the PADs 51 of the flexible printed circuit 50 are disposed in one column, and are electrically coupled to the printed circuit board 60. In the PAD connection unit, the PADs are disposed with a pitch of 0.5 mm, for example, because of the connectivity of the flexible printed circuit 50 and the printed circuit board 60. Also, since the IC 53 performs differential transmission so that when the terminals of the IC 53 and the PADs 51 are electrically coupled, wire lines connecting the terminals of the IC 53 and the PADs 51 become stretched in a tapered manner as shown in FIG. 3.

For example, if it is assumed that signal transmission is performed for each four channels, the polymer waveguide 6 of four channels needs to have a size of 1 mm (=0.25 mm/4).

On the other hand, the flexible printed circuit 50 uses one channel having two terminals P and N, and thus the PAD 51 needs to have a size of 4 mm (=0.5×2×4). Accordingly, the pitch is enlarged by four times, which results in an increase in a footprint of a connector connection part of the flexible printed circuit connector 7.

Figure 4:
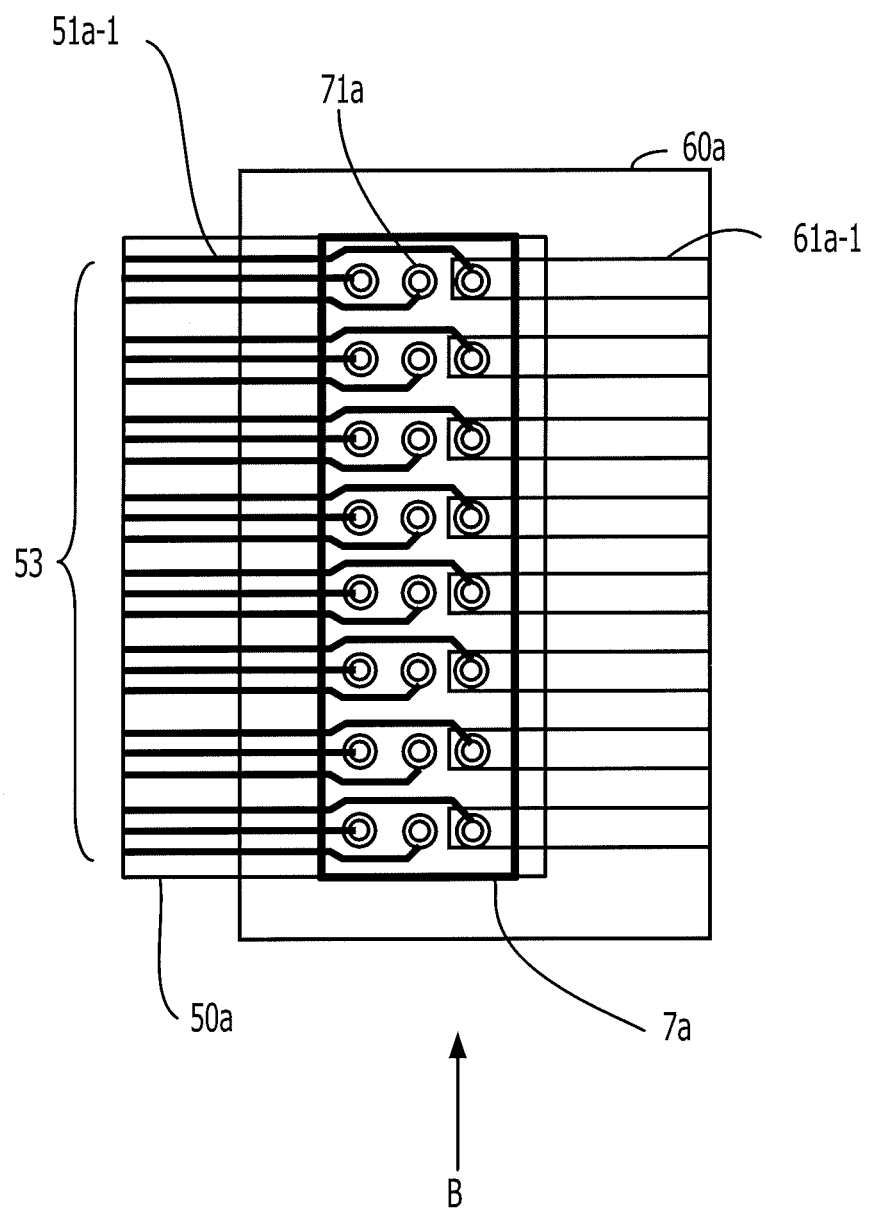
FIG. 4 is a diagram illustrating an example of connection of a high-density flexible-printed-circuit connector.
Figure 5:
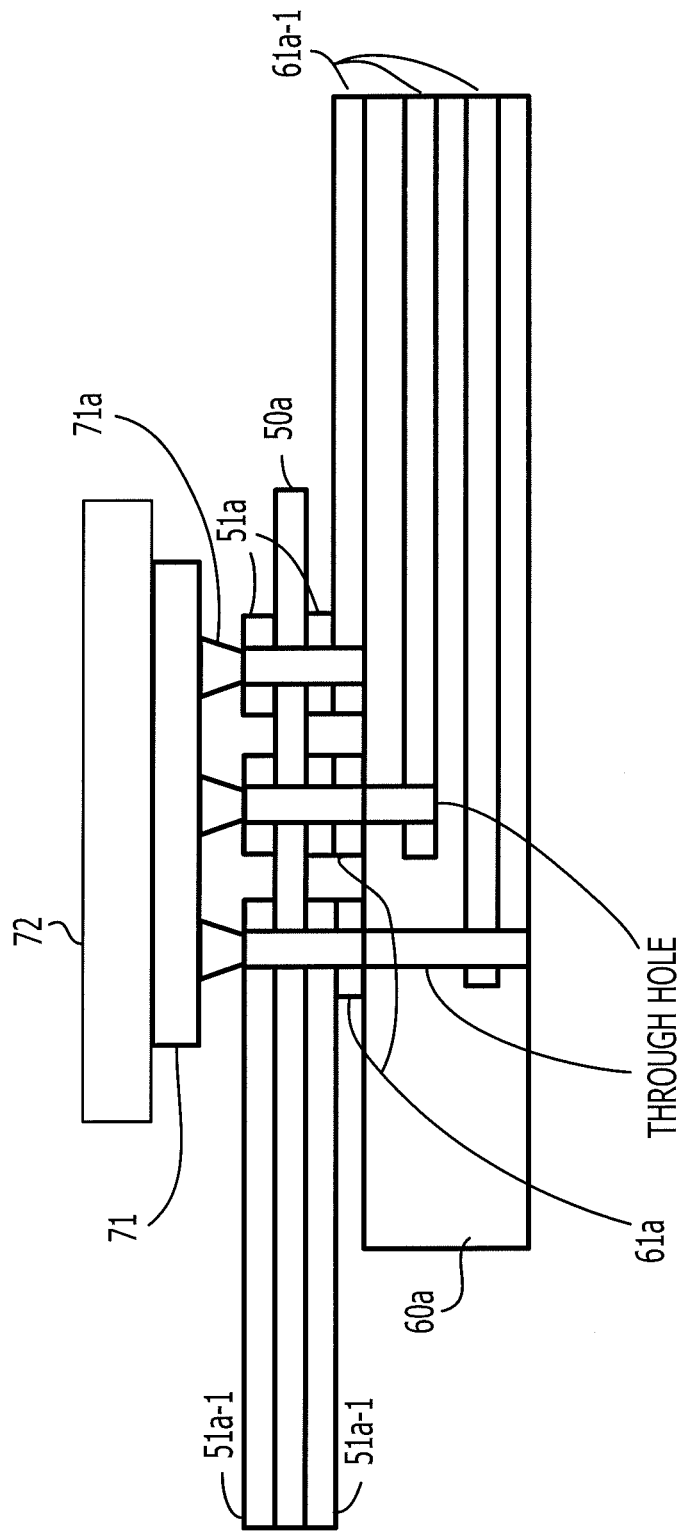
FIG. 5 is a view taken from direction B of FIG. 4.

FIG. 4 is a diagram illustrating an example of connection of a high-density flexible-printed-circuit connector. FIG. 5 is a view taken from direction B of FIG. 4. FIGS. 4 and 5 illustrate a state in which a flexible printed circuit 50$a$ on which electronic parts are mounted is electrically coupled to a printed circuit board 60$a$ using a high-density flexible printed circuit connector 7$a$ (in this regard, the mounting parts, etc., on the flexible printed circuit are illustrated in FIG. 3. However, in FIG. 4, only the connector connection part is illustrated).

The high-density flexible printed circuit connector 7$a$ has a bump sheet 71 and a cover 72. Protruding electrode units (bumps) 71$a$ are formed on the bump sheet 71 in order to connect PADs 51$a$ of the flexible printed circuit 50$a$ and PADs 61$a$ of the printed circuit board 60$a$. Also, the cover 72 is disposed on the bump sheet 71.

The flexible printed circuit 50$a$ is provided with the PADs 51$a$ on both surfaces of the circuit board, the PADs 51$a$ on both surfaces of the circuit board are electrically coupled via a through hole, and a transmission line 51$a$-1 is electrically coupled to the PAD 51$a$.

The printed circuit board 60$a$ is a substrate having a multilayered structure. A PAD 61$a$ disposed on one surface of the circuit board is electrically coupled to a predetermined transmission line 61$a$-1 disposed on a surface of the circuit board and disposed by being inserted via the through hole.

As shown in FIG. 4, the bumps 71$a$ of the high-density flexible printed circuit connector 7$a$ are not arranged in one column, but have a two-dimensional layout (stretching in a plane). In the example in FIG. 4, the bumps 71$a$ are arranged in eight rows and three columns.

When the flexible printed circuit 50$a$ and the printed circuit board 60$a$ are electrically coupled, first, a plurality of the PADs 51$a$ on the flexible printed circuit 50$a$ are overlaid on a plurality of the PADs 61$a$ on the printed circuit board 60$a$. Further, the bumps 71$a$ of the bump sheet 71 are overlaid on the PADs 51$a$ of the flexible printed circuit 50$a$.

And by pressing on the upper side of the cover 72, the bumps 71$a$ of the high-density flexible printed circuit connector 7$a$, the PADs 51$a$ of the flexible printed circuit 50$a$, and the PADs 61$a$ of the printed circuit board 60$a$ are press-contacted.

Thereby, the PADs 51$a$ of the flexible printed circuit 50$a$ and the PADs 61$a$ of the printed circuit board 60$a$ are electrically coupled, and each of the wire lines of the flexible printed circuit 50$a$ is electrically coupled to a corresponding one of the wire lines of the printed circuit board 60$a$ (in this regard, in FIG. 4, the high-density flexible printed circuit connector 7$a$ is illustrated to be seen through so that a connection state of the PADs 51$a$ of the flexible printed circuit 50$a$ and the transmission lines 61$a$-1 of the printed circuit board 60$a$ can be seen).

With the use of such a high-density flexible printed circuit connector 7$a$, for example, when each terminal of the IC 53 is electrically coupled to a bump 71$a$ of the high-density flexible printed circuit connector 7$a$ (the PADs 51$a$ of the flexible printed circuit 50$a$), wire lines do not become stretched in a tapered manner.

Accordingly, it becomes possible to narrow an area required for wire line connection between the terminals of the IC 53 and the bumps 71a (PADs 51a), and to suppress and reduce an increase in a footprint of the connector connection part.

By disposing the bumps 71a in two dimensions and narrowing the pitch as described above, it is possible to improve implementation density. However, when the bumps 71a are simply disposed in two dimensions, if a high-speed signal (for example, not less than 25 Gb/s) is transmitted, crosstalk arises between adjacent channels. Thus the transmission quality deteriorates, and high-speed transmission has failed to be accomplished.

The connector 1 has been made in view of these points, and is intended to suppress crosstalk in order to improve transmission quality while keeping a state of narrowed pitches.

Next, a description will be given of a layout of electrodes 11 on the connector 1. In this regard, hereinafter, the bump 11 is called a bump 11. Also, the circuit board 3 corresponds to, for example, a flexible printed circuit, and thus is called a flexible printed circuit 3. Also, the circuit board 4 corresponds to for example, a printed circuit board, and thus is called a printed circuit board 4.

As described above in FIG. 1, for the transmission line L1p and the transmission line L1n, which form a pair on the flexible printed circuit 3, the bump 11 connects the transmission line L1p to a printed circuit board 4, and connects the transmission line L1n to the printed circuit board 4. In this case, the bump 11 is disposed at a position where the coupling state is maintained between the transmission line L1p and the transmission line L1n at the time of connection from the flexible printed circuit 3 to the printed circuit board 4.

Figure 6:
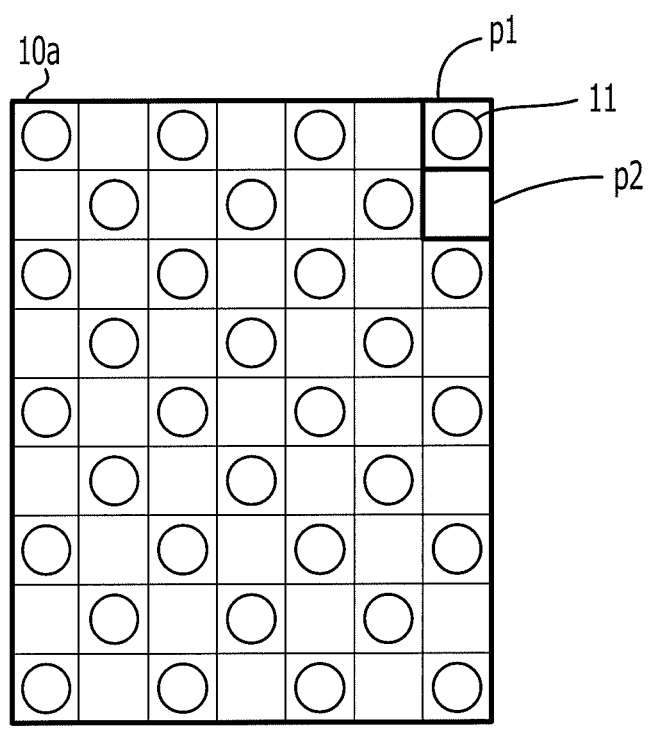
FIG. 6 is a diagram illustrating an example of a layout of bumps.

FIG. 6 is a diagram illustrating an example of a layout of the bumps 11. When the two-dimensional layout surface 10a on which the bumps 11 are disposed is partitioned in a grid-shaped manner, a layout area p1 including disposition of the bump 11 and a non-layout area p2 not including disposition of the bump 11 are alternately arranged.

Figure 7:
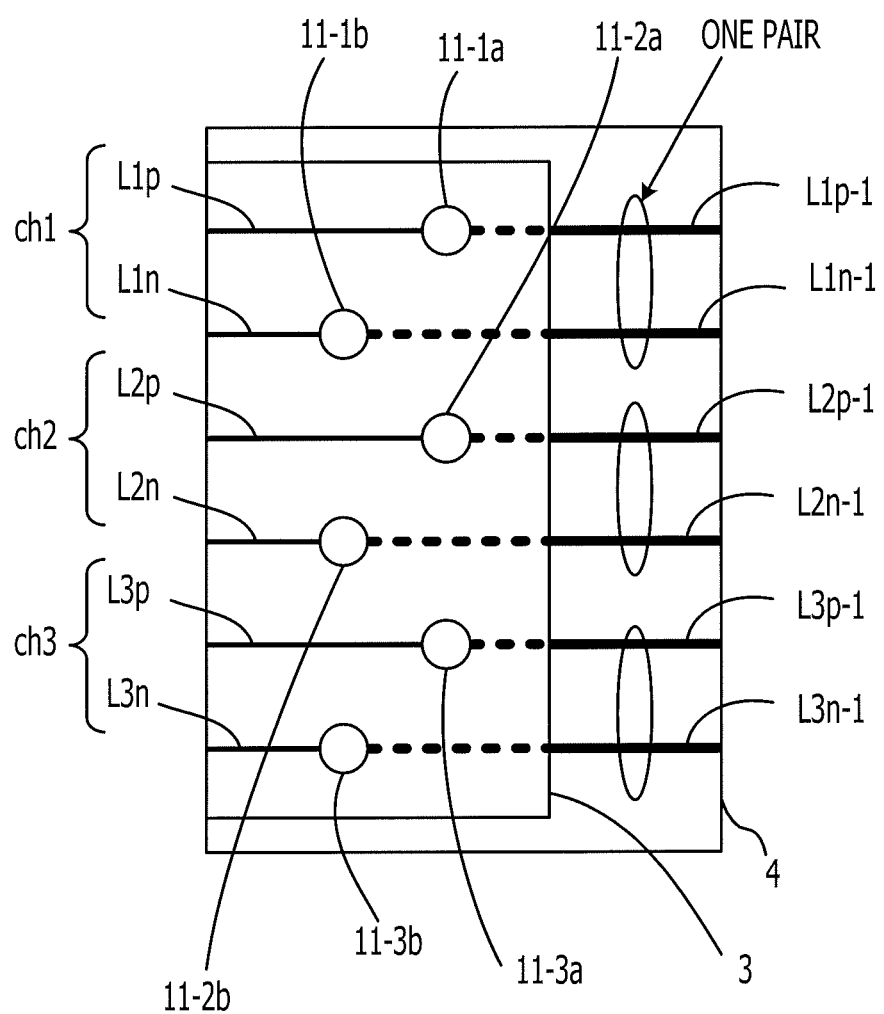
FIG. 7 is a diagram illustrating a connection state of transmission lines.

FIG. 7 is a diagram illustrating a connection state of transmission lines. The transmission lines on the flexible printed circuit are electrically coupled to the transmission lines on the printed circuit board 4 through the connector having the bumps 11 that are disposed as shown in FIG. 6.

A description will be given of a connection state of the transmission line. A pair of the transmission lines L1p and L1n, a pair of the transmission lines L2p and L2n, and a pair of the transmission lines L3p and L3n are disposed on the flexible printed circuit 3.

The transmission line L1p is electrically coupled to the bump 11-1a, and the transmission line L1n is electrically coupled to the bump 11-1b. The transmission line L2p is electrically coupled to the bump 11-2a, and the transmission line L2n is electrically coupled to the bump 11-2b. The transmission line L3p is electrically coupled to the bump 11-3a, and the transmission line L3n is electrically coupled to the bump 11-3b.

Also, a pair of the transmission lines L1p-1 and L1n-1, a pair of the transmission lines L2p-1 and L2n-1, and a pair of the transmission lines L3p-1 and L3n-1 are disposed on the printed circuit board 4.

The transmission lines of the flexible printed circuit 3 and the corresponding transmission lines of the printed circuit board 4 are electrically coupled through the plurality of bumps 11 of the connector 1. That is to say, the transmission line L1p is electrically coupled to the transmission line L1p-1 through the bump 11-1a, and the transmission line L1n is electrically coupled to the transmission line L1n-1 through the bump 11-1b.

The transmission line L2p is electrically coupled to the transmission line L2p-1 through the bump 11-2a, and the transmission line L2n is electrically coupled to the transmission line L2n-1 through the bump 11-2b. The transmission line L3p is electrically coupled to the transmission line L3p-1 through the bump 11-3a, and the transmission line L3n is electrically coupled to the transmission line L3n-1 through the bump 11-3b.

Differential transmission is performed between the channel ch1 including the transmission line L1p and the transmission line L1n, between the channel ch2 including the transmission line L2p and the transmission line L2n, and the channel ch3 including the transmission line L3p and the transmission line L3n.

In this case, when the transmission lines of the flexible printed circuit 3 and the corresponding transmission lines of the printed circuit board 4 are electrically coupled through the bumps 11 of the connector 1 as described above, it is possible to connect the flexible printed circuit 3 and the printed circuit board 4 in a state in which leakage of electromagnetic field caused by crosstalk among the mutual channels ch1 to ch3 is suppressed. That is to say, it becomes possible to connect the lines while the occurrence of crosstalk between the channels is reduced (a description will be given later of a reason that crosstalk is suppressed in FIG. 11).

Figure 8:
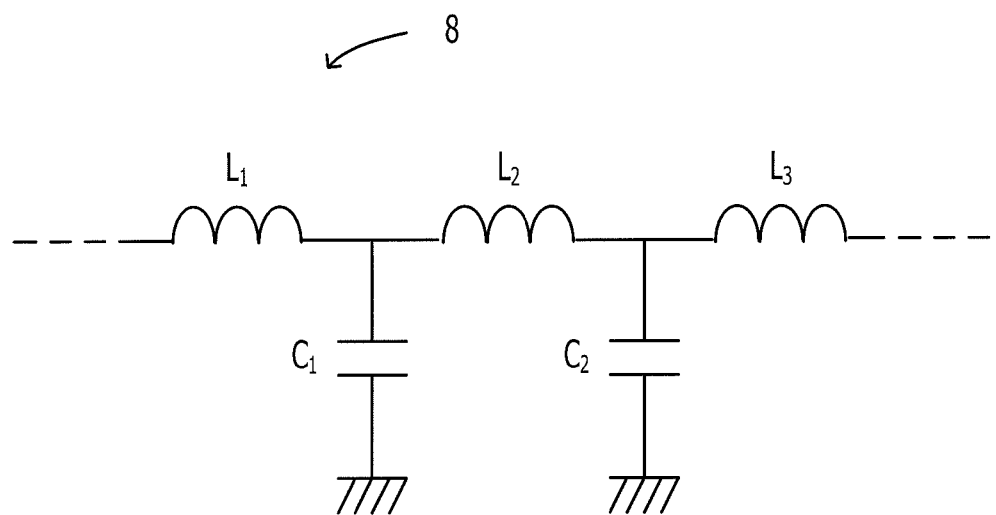
FIG. 8 is a model diagram of a transmission line.

Next, a description will be given of the occurrence of crosstalk. FIG. 8 is a model diagram of a transmission line. A single transmission line 8 is equivalently assumed to be a line including an inductor (L) and a capacitor (C).

When a current flows through the transmission line 8, a magnetic field arises, and a voltage occurs because of the magnetic field. Thus, the transmission line includes inductance components (inductors L1, L2, L3, . . . ). Capacitance components (capacitors C1, C2, . . . ) exist between GND and the line (the transmission line 8 indicates an ideal conductor, and includes a finite resistor in reality.) After that, a same connection configuration continues for infinite length.

On the other hand, the transmission line 8 has a specific impedance, and the impedance is called a characteristic impedance. A characteristic impedance Z for each unit length of the transmission line 8 is represented by $Z=(L/C)^{1/2}$.

Figure 9:
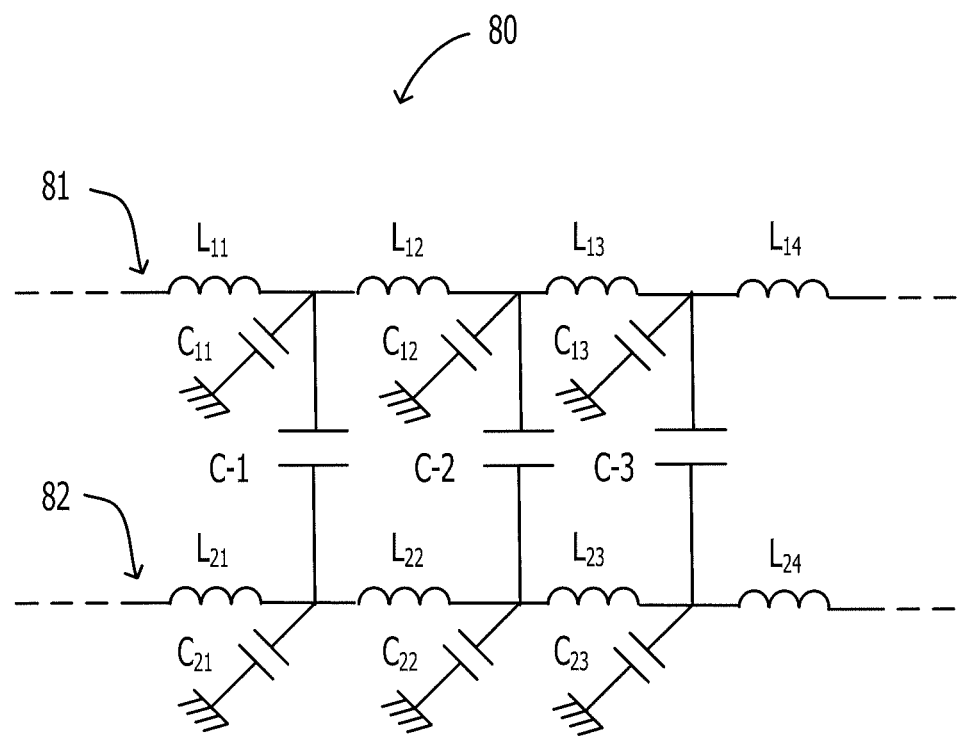
FIG. 9 is a model diagram of a transmission line.

FIG. 9 is a model diagram of a transmission line. FIG. 9 illustrates a model of a pair of parallel differential transmission lines 80. A single transmission line 81 is equivalently assumed to be a line, as shown in the figure, including an inductor (L) and a capacitor (C). When a current flows through the transmission line 81, a magnetic field arises, and a voltage occurs because of the magnetic field. Thus, the transmission line includes inductance components (inductors L11, L12, L13, L14, . . . ). Capacitance components (capacitors C11, C12, C13, . . . ) exist between GND and the line (the transmission line 81 indicates an ideal conductor, and includes a finite resistor in reality.) After that, a same connection configuration continues for infinite length.

In the same manner, a single transmission line 82 is equivalently assumed to be a line, as shown in the figure, including an inductor (L) and a capacitor (C). When a current flows through the transmission line 82, a magnetic field arises, and a voltage occurs because of the magnetic field. Thus, the transmission line includes inductance components (inductors L21, L22, L23, L24, . . . ). Capacitance components (capacitors C21, C22, C23, . . . ) exist between GND and the line (the transmission line 82 indicates an ideal conductor, and includes a finite resistor in reality.) After that, a same connection configuration continues for infinite length.

And the differential transmission line 80 is equivalently assumed to be a transmission line including parallel two lines, namely, a single transmission line 81 and a single transmission line 82 that are electrically coupled with the capacitors C-1, C-2, C-3, . . . .

Here, when a differential transmission line is formed by disposing two of the transmission lines 8 shown in FIG. 8 at positions in close proximity and transmitting signals having opposite phases with each other, the transmission line comes to have a model configuration as the differential transmission line 80 shown in FIG. 9.

When differential transmission is performed between the transmission line 81 and the transmission line 82, the capacitance of the capacitors C11, C12, and C13 included in the transmission line 81 decreases, and the capacitance of the capacitors C21, C22, and C23 included in the transmission line 82 decreases.

And capacitors C-1, C-2, and C-3 occur between the transmission line 81 and the transmission line 82 as new capacitance components. The transmission line comes to have a configuration in which the transmission line 81 and the transmission line 82 are equivalently electrically coupled with the capacitors C-1, C-2, and C-3. In this manner, in the differential transmission line 80, one of the transmission lines, the transmission line 81 and the other of the transmission lines, the transmission line 82, form a coupling state with the capacitors C-1, C-2, C-3, . . . .

The characteristic impedance is a ratio of a voltage across any two points in two parallel lines, respectively, extending indefinitely to the current in transmission at the point. Accordingly, when reflections are absent in such a electrically coupled state, the ratio of the voltage to the current becomes a certain real number at any position in the differential transmission line 80, the characteristic impedance between both of the transmission lines are kept constant, and differential transmission is performed normally.

Figure 10:
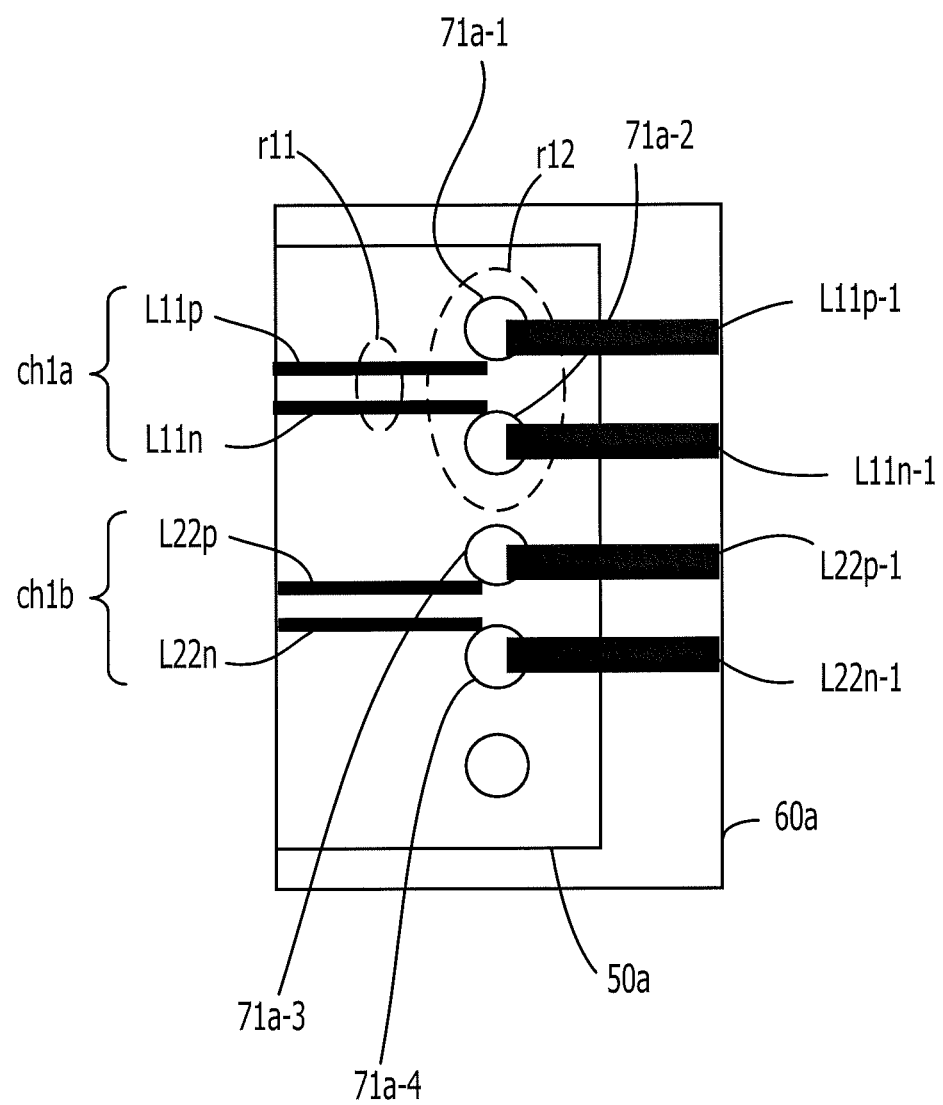
FIG. 10 is a diagram illustrating a bump layout when crosstalk arises.

Next, a description will be given of a bump layout when crosstalk arises. FIG. 10 is a diagram illustrating a bump layout when crosstalk arises. FIG. 10 illustrates a case where the bumps are two-dimensionally arranged in m rows and n columns as described in FIG. 4. In FIG. 10, only one column is illustrated among the two-dimensional layout.

A pair of the transmission lines L11p and L11n and a pair of the transmission lines L22p and L22n are disposed on the flexible printed circuit 50a. The transmission lines L11p and L11n form a channel ch1a, and the transmission lines L22p and L22n form a channel ch1b.

Also, the transmission line L11p is coupled to the bump 71a-1, the transmission line L11n is electrically coupled to the bump 71a-2. The transmission line L22p is electrically coupled to the bump 71a-3, and the transmission line L22n is electrically coupled to the bump 71a-4. Further, a pair of the transmission lines L11p-1 and L11n-1 and a pair of the transmission lines L22p-1 and L22n-1 are disposed on the printed circuit board 60a.

In this manner, the wire lines of the transmission lines of the flexible printed circuit 50a and the corresponding transmission lines of the printed circuit board 60a are electrically coupled with each other through the bumps. That is to say, the transmission line L11p is electrically coupled to the transmission line L11p-1 through the bump 71a-1, and the transmission line L11n is electrically coupled to the transmission line L11n-1 through the bump 71a-2. The transmission line L22p is electrically coupled to the transmission line L22p-1 through the bump 71a-3, and the transmission line L22n is electrically coupled to the transmission line L22n-1 through the bump 71a-4.

Here, seen is a coupling state of the channel ch1a including the transmission lines L11p and L11n. In this regard, an area r11 illustrates a wiring part of the transmission lines L11p and L11n on the flexible printed circuit 50a.

An area r12 illustrates a connection part through the bump 71a-1 between the transmission line L11p on the flexible printed circuit 50a and the transmission line L11p-1 on the printed circuit board 60a, and a connection part through the bump 71a-2 between the transmission line L11n on the flexible printed circuit 50a and the transmission line L11n-1 on the printed circuit board 60a.

In the area r11, the coupling state between the transmission line L11p and the transmission line L11n is maintained. However, in the area r12, a distance between the bump 71a-1 and the bump 71a-2 is increased than a distance between the transmission line L11p and the transmission line L11n in the area r11.

Accordingly, in this bump connection part, the coupling between the transmission line L11p and the transmission line L11n is broken, and the coupling state in the area r11 becomes difficult to be maintained.

That is to say, in the area r11, differential transmission is performed on the transmission lines L11p and L11n while the coupling state is maintained. However, in the connection part of the bumps 71a-1 and 41a-2 in the area r12, a difference arises between the distance of the transmission line L11p and the transmission line L11n, and the distance of the bump 71a-1 and the bump 71a-2.

The distance between a center position of the bump 71a-1 and a center position of the bump 71a-2 is not less than 0.5 mm even in the case of narrowed pitches. Accordingly, even if a signal is transmitted while a certain distance for maintaining the coupling state is kept between the transmission lines L11p and L11n, the distance between the transmission lines L11p and L11n becomes separated not less than 0.5 mm in the bump connection part, the coupling is liable to break, and thus it becomes difficult to maintain the coupling state.

When the coupling is broken, imbalance arises between mutual capacitance of the two transmission lines forming the differential transmission line. And a signal of one channel is liable to leak into the signal of the other channel, and far-end crosstalk is liable to arise between the channels.

Figure 11:
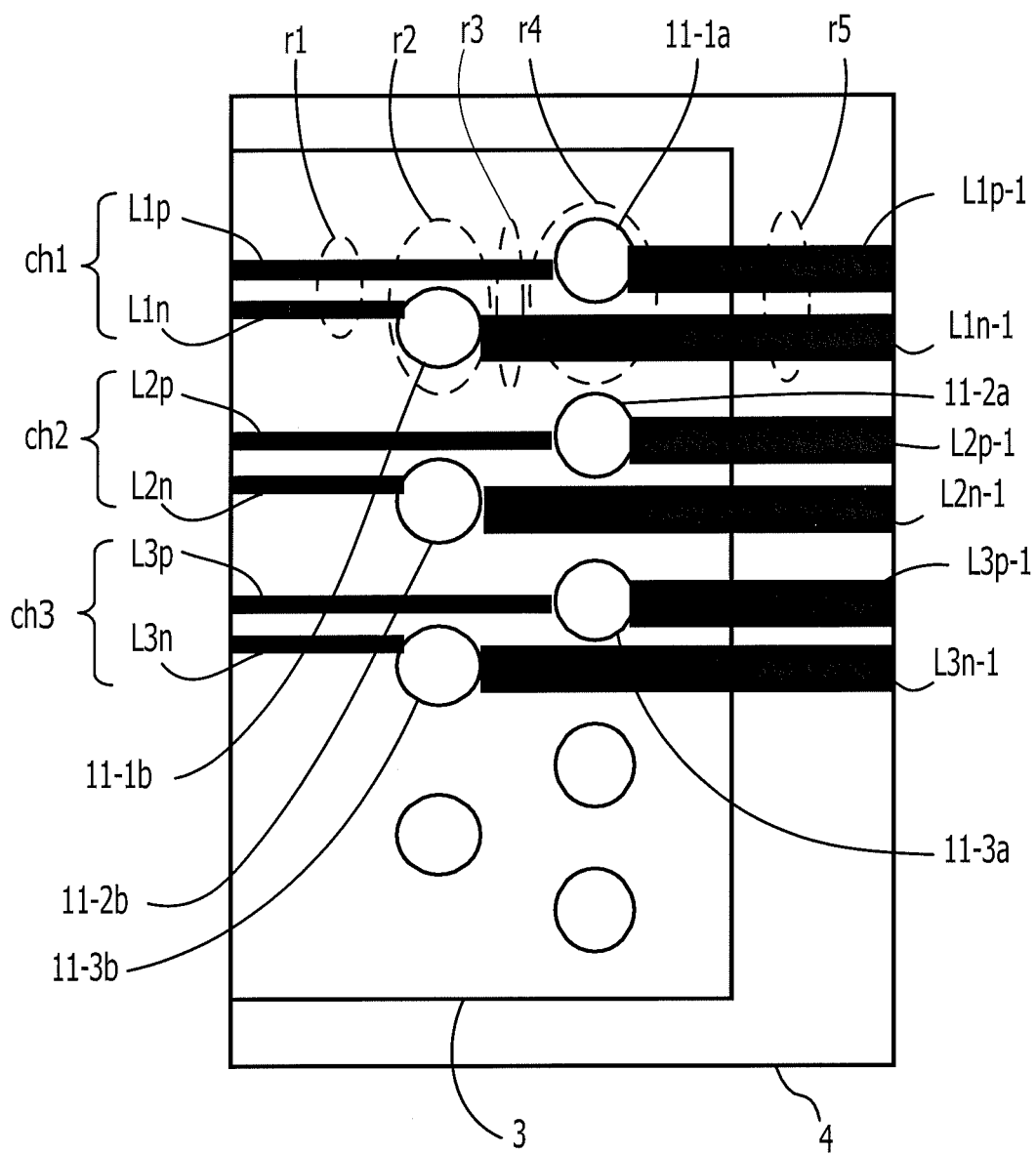
FIG. 11 is a diagram for explaining a state in which crosstalk is suppressed.

Next, a description will be given of a reason that crosstalk is suppressed by wire-connecting with the connector 1. FIG. 11 is a diagram for explaining a state in which crosstalk is suppressed. FIG. 11 illustrates a bump layout of the connector 1, which is the same layout as that in FIG. 7.

Seen is the coupling state of areas r1 to r5 of the channel ch1. In this regard, the area r1 indicates a wiring part of the transmission lines L1p and L1n on the flexible printed circuit 3.

The area r2 indicates a wiring part of the transmission line L1p on the flexible printed circuit 3 and a connection part of the transmission line L1n on the flexible printed circuit 3 and the transmission line L1n-1 on the printed circuit board 4 through the bump 11-1b.

The area r3 indicates a wiring part of the transmission line L1p on the flexible printed circuit 3, and a wiring part of the transmission line L1n-1 on the printed circuit board 4. The area r4 indicates a connection part of the transmission line L1p on the flexible printed circuit 3 and the transmission line L1p-1 on the printed circuit board 4 through the bump 11-1a, and a wiring part of the transmission line L1n-1 on the printed circuit board 4. The area r5 indicates a wiring part of the transmission lines L1p-1 and L1n-1 on the printed circuit board 4.

First, in the area r1, a coupling state between the transmission line L1p and the transmission line L1n is maintained. In the area r2, a distance between the transmission line L1p and a center position of the bump 11-1*b* is substantially equal to a distance between the transmission line L1*p* and the transmission line L1*n* in the area r1. Accordingly, in the bump connection part of the area r2, the coupling state in the preceding area r1 is maintained.

In the area r3, a distance between the transmission line L1*p* and the transmission line L1*n*-1 is substantially equal to a distance between the transmission line L1*p* and a center position of the bump 11-1*b* in the area r2. Accordingly, in the area r3, the coupling state in the preceding area r2 is maintained.

In the area r4, a distance between a center position of the bump 11-1*a* and the transmission line L1*n*-1 is substantially equal to a distance between the transmission line L1*p* and the transmission line L1*n* in the area r3. Accordingly, in the bump connection part of the area r4, the coupling state in the preceding area r3 is maintained.

In the area r5, a distance between the transmission line L1*p*-1 and the transmission line L1*n*-1 is substantially equal to a distance between a center position of the bump 11-1*a* in the area r4 and the transmission line L1*n*-1. Accordingly, in the area r5, the coupling state in the preceding area r4 is maintained.

In this manner, in the bump layout of the connector 1, the coupling state of a pair of transmission lines of the differential transmission line is also kept constant at the time of connection of the flexible printed circuit 3 and the printed circuit board 4.

Figure 12:
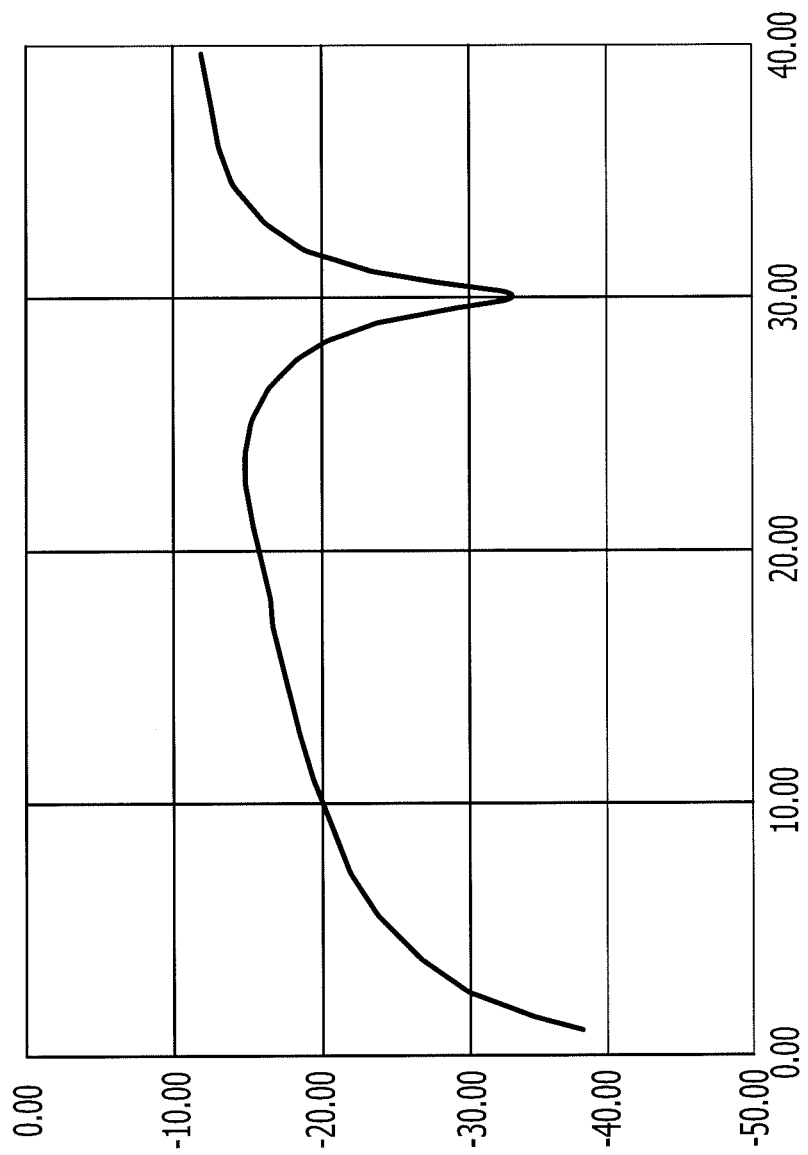
FIG. 12 is a diagram illustrating a crosstalk characteristic.
Figure 13:
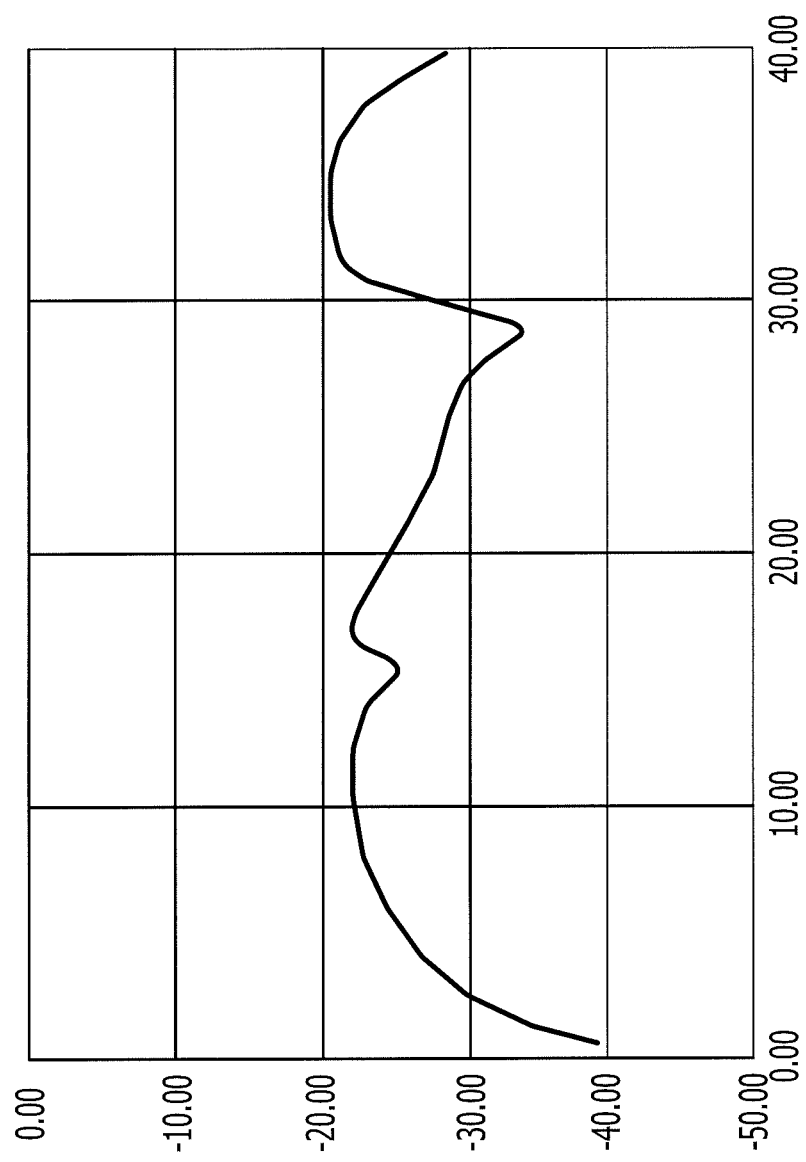
FIG. 13 is a diagram illustrating a crosstalk characteristic.

FIGS. 12 and 13 are diagrams illustrating crosstalk characteristics. The vertical axis shows crosstalk signal level (dB), and the horizontal axis shows frequency (GHz). FIG. 12 is a crosstalk characteristic measured when electrically coupled by the above-described bump layout (related-art two-dimensional layout) in FIG. 10. FIG. 13 is a crosstalk characteristic measured when electrically coupled by the above-described bump layout (two-dimensional layout according to this technique) in FIG. 11.

When a high-speed signal of 40 GHz is transmitted through the differential transmission line, a crosstalk signal level in FIG. 12 is about −12 dB, and a crosstalk signal level in FIG. 13 is −28 dB. This means that the amount of attenuation of the crosstalk signal increases (the amount of leakage is small). That is to say, it is understood that when electrically coupled using the above-described bump layout in FIG. 11, the crosstalk characteristic has improved.

As described above, the connector 1 has a configuration in which the bumps are laid out such that the coupling state between one of the pair of transmission lines and the other of the pair of transmission lines, which constitute the differential transmission line, is maintained at the time of connecting the flexible printed circuit 3 and the printed circuit board 4.

Thereby, when the flexible printed circuit 3 and the printed circuit board 4 are electrically coupled, a distance between transmission lines of the differential transmission line is kept constant in the bump connection part, and thus it is possible to connect the wire lines while the coupling state is maintained. Accordingly, it is possible to suppress the occurrence of crosstalk. Thus, it becomes possible to improve transmission quality when the connector is electrically coupled, and to perform high-quality high-speed signal transmission.

Next, a description will be given of an optical transmission apparatus for use in optical interconnect as an example of application of the connector 1 to an apparatus. The optical interconnect is a generic term for short-distance data communications using light, which are performed, for example, between circuits inside a semiconductor chip, parts within a computer, and among a plurality of computers, etc. The optical interconnect is capable of wider broadband access and lower power consumption compared with related-art electrical communications using copper wire lines, etc.

Figure 14:
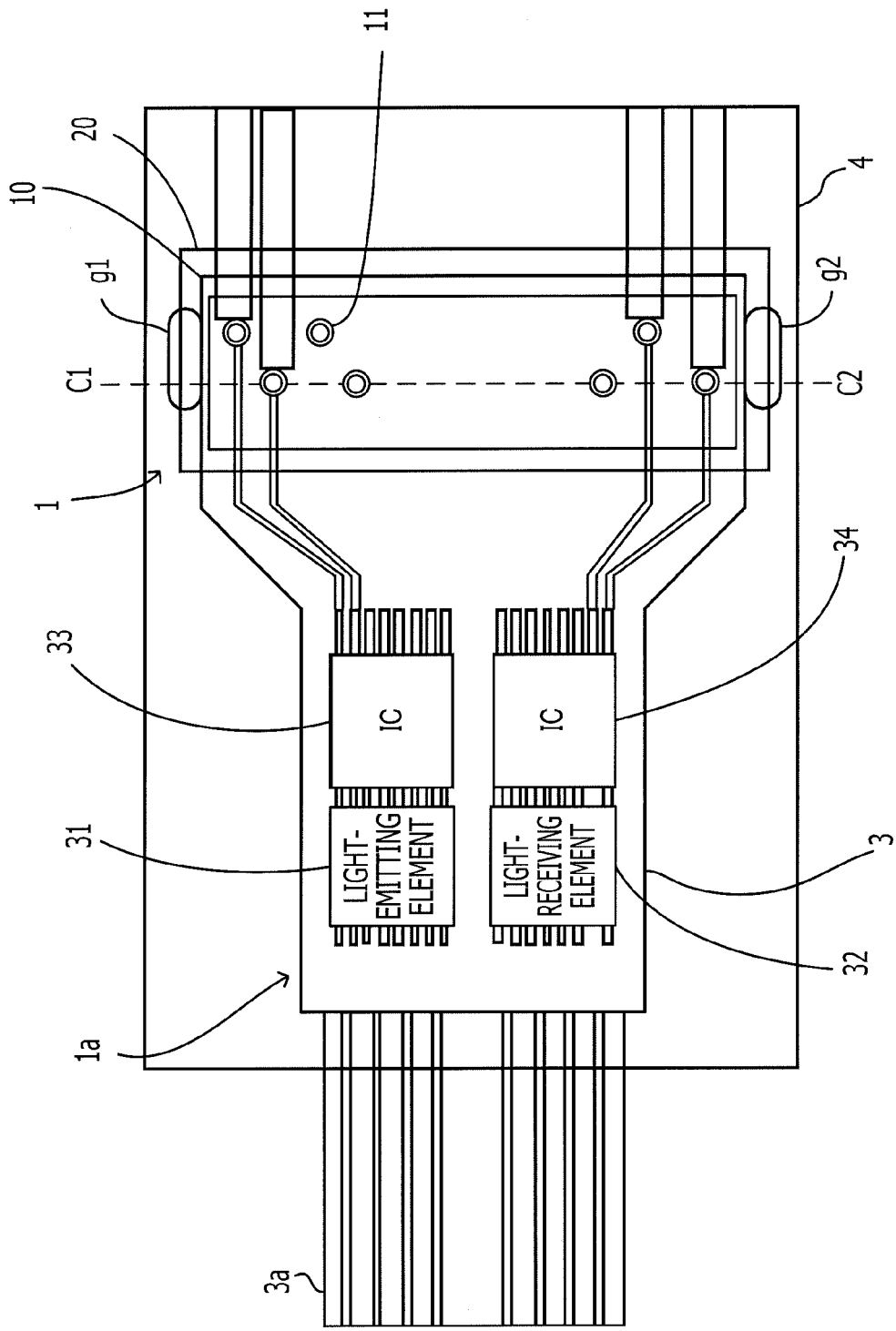
FIG. 14 is a diagram illustrating an example of a configuration of an optical transmission apparatus.
Figure 15:
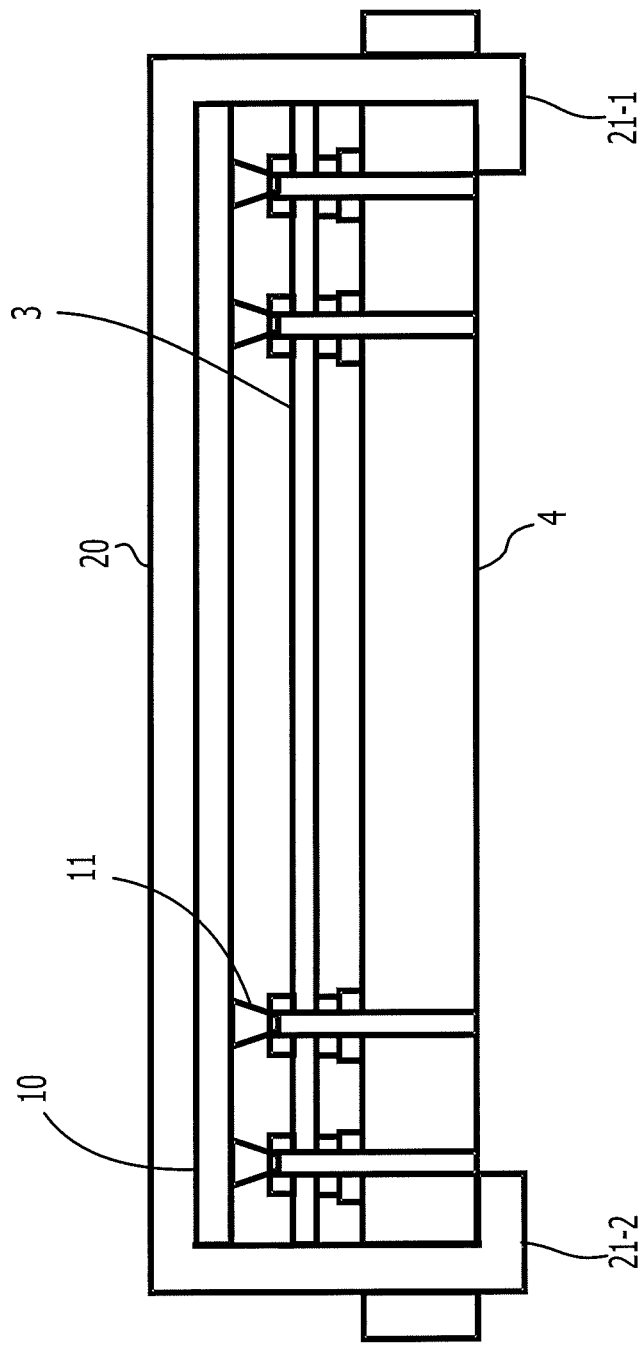
FIG. 15 is a sectional view taken on line C1-C2 of FIG. 14.

FIG. 14 is a diagram illustrating an example of a configuration of an optical transmission apparatus. FIG. 15 is a sectional view taken on line C1-C2 of FIG. 14. An optical transmission apparatus 1*a* is an apparatus that includes a flexible printed circuit 3 and a connector 1, and performs, as optical transmission processing, for example, optical transmission and receiving, O/E conversion or E/O conversion. The figures show a state in which the flexible printed circuit 3 is electrically coupled to the printed circuit board 4 by the connector 1.

As an optical transmission processing unit, for example, a light-emitting element 31 (for example, VCSEL (Vertical Cavity Surface Emitting Laser)), a light-receiving element 32 (for example, PD (Photodiode)), an IC 33, which is a driver having a V/I conversion function, and an IC 34, which has a I/V conversion function and performs transimpedance amplification, are mounted on the flexible printed circuit 3. Also, a polymer waveguide 3*a*, which is a sheet-shaped optical waveguide that can be laminated on the flexible printed circuit 3, is electrically coupled to the light-emitting element 31 and the light-receiving element 32.

In this regard, differential transmission is performed between the ICs 33 and 34, and the printed circuit board 4. Accordingly, the ICs 33 and 34 perform transmission for one-channel signal using a P (positive) channel signal and an N (negative) channel signal that are in opposite phases with each other by a pair of signal lines.

On the other hand, the connector 1 includes a sheet 10 and a cover 20. Bumps 11 are formed in a two-dimensional layout on the sheet 10 as described in FIGS. 6 and 7. The flexible printed circuit 3 is positioned correctly, and at the same time, is electrically coupled to the printed circuit board 4 or the electronic part of the opposite connection side. In this regard, the sheet 10 itself is made of an insulating material, and metal bumps 11 are attached on one side of the sheet 10.

Also, the thin plate-shaped cover 20, which applies pressure evenly, is positioned on a back surface of the sheet 10 on which the bumps 11 are not attached. The cover 20 is provided with detachable hooks 21-1 and 21-2. At the time of connector-connection, the hooks 21-1 and 21-2 mechanically lock with guide holes g1 and g2 disposed on the printed circuit board 4.

When the flexible printed circuit 3 and the printed circuit board 4 are electrically coupled, first, a plurality of the PADs of the flexible printed circuit 3 are overlaid on a plurality of the PADs on the printed circuit board 60*a*. Further, the bumps 11 formed on the sheet 10 are overlaid on the PADs of the flexible printed circuit 3.

And by pressing on the upper side of the cover 20, the bumps 11 of the connector 1, the PADs of the flexible printed circuit 3, and the PADs of the printed circuit board 4 are press-contacted. Thereby, the PADs of the flexible printed circuit 3 and the PADs of the printed circuit board 4 are electrically coupled, and each of the wire lines of the flexible printed circuit 3 is electrically coupled to a corresponding one of the wire lines of the printed circuit board 4 (in this regard, in FIG. 14, the connector 1 is illustrated to be seen through so that a connection state of the transmission lines on the flexible printed circuit 3 and the transmission lines on the printed circuit board 4 can be seen through the bump 11).

Referring to a signal flow, an electronic signal transmitted from the printed circuit board 4 is received by the IC 33 on the flexible printed circuit 3 through the bumps 11 of the connector 1. The IC 33 performs V/I conversion so that the voltage signal is converted into a current signal. The light-emitting element 31 performs E/O conversion so as to convert the current signal output from the IC 33 into an optical signal. The optical signal is output to the outside through the polymer waveguide 3a.

On the other hand, an optical signal transmitted through the polymer waveguide 3a is received by the light-receiving element 32, and is converted into an optical current signal. The IC 34 converts the optical current signal into a voltage signal, and outputs the voltage signal. The voltage signal output from the IC 34 is electrically coupled to the transmission line on the printed circuit board 4 through the bumps 11 on the connector 1.

Figure 16:
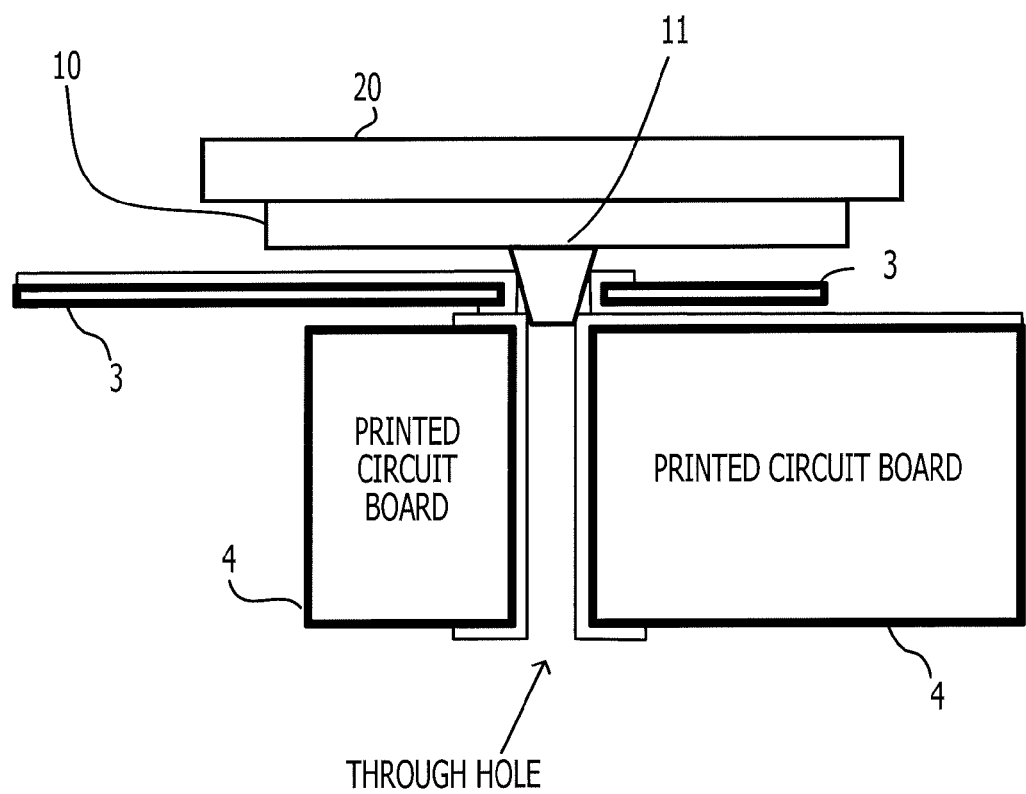
FIG. 16 is a diagram illustrating a bump connection part.
Figure 17:
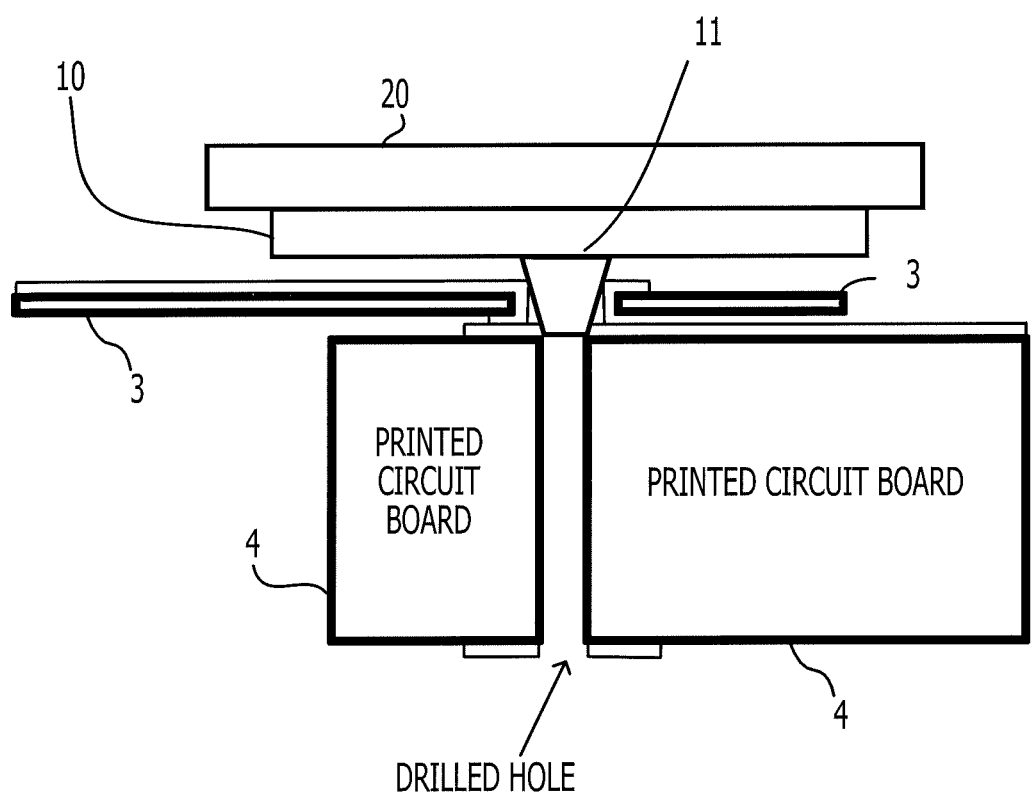
FIG. 17 is a diagram illustrating a bump connection part.
Figure 18:
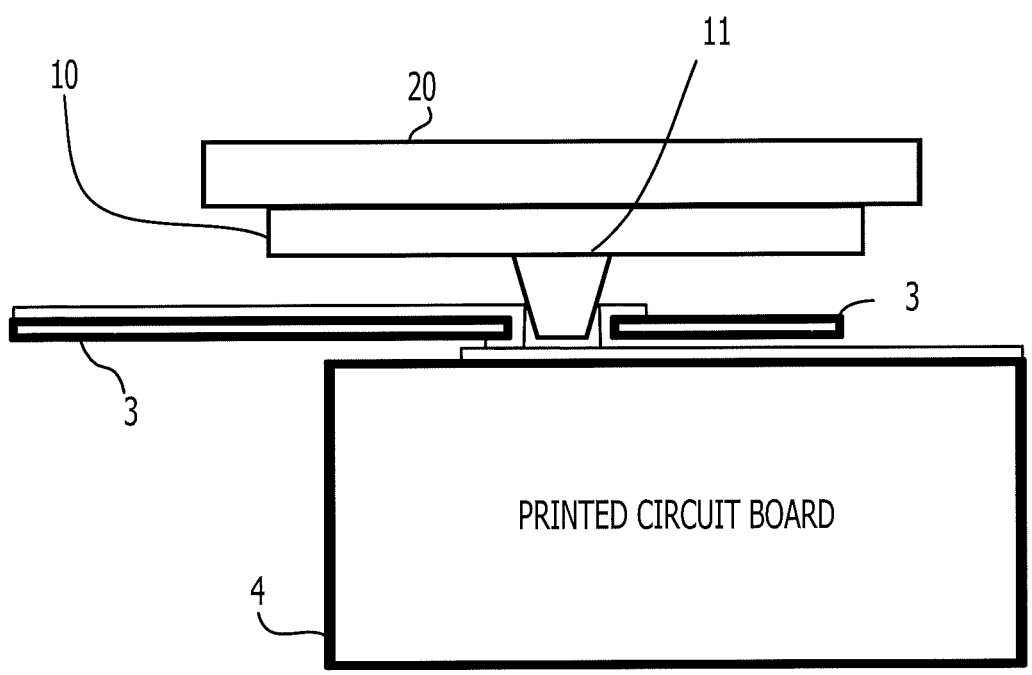
FIG. 18 is a diagram illustrating a bump connection part.

Next, descriptions will be given of variations of the bump connection part. FIGS. 16 to 18 are diagrams illustrating a bump connection part. FIG. 16 illustrates a case where the flexible printed circuit 3 and the printed circuit board 4 are provided with through holes. FIG. 17 is a case where the flexible printed circuit 3 is provided with a through hole, and the printed circuit board 4 is provided with a drilled hole, which is a through hole without metal foil plating. FIG. 18 is a case where the flexible printed circuit 3 is provided with a through hole, and the printed circuit board 4 is not provided with either a through hole or a drilled hole.

In any one of the bump connections in FIGS. 16 to 18, the PADs of the flexible printed circuit 3 are overlaid on the PADs of the printed circuit board 4, the bumps 11 are overlaid on the PADs of the flexible printed circuit 3, and the upper side of the cover 20 is pressed. Thereby, the transmission lines on the flexible printed circuit 3 and the corresponding transmission lines on the printed circuit board 4 are conducted.

Here, as shown in FIG. 16, the flexible printed circuit 3 is provided with a through hole, and the printed circuit board 4 is provided with a through hole, and then both of them are bump-connect so that contactivity between the flexible printed circuit 3 and the printed circuit board 4 is improved.

On the other hand, in the case where a drilled hole is disposed at a connection part of the printed circuit board 4 as shown in FIG. 17, and in the case where a through hole is disposed only on the flexible printed circuit 3 as shown in FIG. 18, a land diameter of the signal line can be made small, and thus it is possible to improve a high-frequency characteristic. Also, it is possible to suppress formation of an open stub (a micro strip line having an open tip from a branch of a main transmission line), and thus it is possible to reduce deterioration of the characteristic caused by the stub.

In the above, descriptions have been given of the embodiments. However, the configurations of the individual units described in the embodiments can be replaced by the other configurations having same functions as those in the individual units. Also, any other components and process may be added.

Transmission quality at the time of connecting with a connector is improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention, the scope of which is defined in the claims and their equivalents.

What is claimed is:

1. An optical transmission apparatus comprising:
a first circuit board that includes an optical transmission processing circuit performing transmission processing of optical signals, a first transmission line electrically coupled to the optical transmission processing circuit, a first pad on one surface of the first circuit board electrically coupled to the first transmission line, and a second pad on the other surface of the first circuit board electrically coupled to the first pad;
a second circuit board that includes a second transmission line of a layer of a multilayered structure and a third pad on one surface of the second circuit board electrically coupled to the second transmission line and the second pad; and
a bump sheet that has an electrode disposed in two dimensions at a position to couple with the first pad when the second circuit board is electrically coupled with the first circuit board, the first pad being electrically coupled to the electrode.

2. The optical transmission apparatus according to claim 1, wherein the bump sheet has a grid-shaped electrode layout, including a plurality of electrodes, in which a layout area, including disposition of an electrode, and a non-layout area, not including disposition of an electrode, are alternately arranged.

3. The optical transmission apparatus according to claim 1, wherein the bump sheet includes a plurality of the electrodes attached thereto and a cover configured to be hooked to the second circuit board, the cover applying pressure evenly on the electrodes from a back surface of the bump sheet.

4. The optical transmission apparatus according to claim 1, wherein the first transmission line and the second transmission line are individually paired.

5. A bump sheet comprising:
an electrode electrically coupled to a transmission line of a first circuit board, wherein
the electrode is disposed in two dimensions at a position to couple with the transmission line when electrically coupling the first circuit board with a second circuit board.

6. The bump sheet according to claim 5, wherein the bump sheet has an electrode layout, including a plurality of electrodes, in which a layout area, including disposition of an electrode, and a non-layout area, not including disposition of an electrode, are alternately arranged in a grid-shaped manner.

7. The bump sheet according to claim 5, wherein
the bump sheet includes a plurality of electrodes attached thereto, and
the bump sheet further comprises a cover configured to be hooked to the second circuit board and apply pressure evenly on the electrodes from a back surface of the bump sheet.

* * * * *